United States Patent [19]
Smiley

[11] 3,965,708
[45] June 29, 1976

[54] HUB CAP LOCKING DEVICE

[76] Inventor: Don A. Smiley, 5340 W. Race, Chicago, Ill. 60644

[22] Filed: Dec. 5, 1974

[21] Appl. No.: 529,687

[52] U.S. Cl................................. 70/166; 70/259; 301/37 AT
[51] Int. Cl.².................... E05B 65/12; B60B 7/06
[58] Field of Search ............ 70/164, 166, 167, 258, 70/259; 301/37 AT, 108 SC

[56] References Cited
UNITED STATES PATENTS

| | | | |
|---|---|---|---|
| 2,727,790 | 12/1955 | Gaylord | 301/37 AT |
| 3,170,733 | 2/1965 | Lamme | 301/37 |
| 3,513,673 | 5/1970 | Trainor | 70/259 |
| 3,534,570 | 10/1970 | Mauro | 70/167 |

*Primary Examiner*—Albert G. Craig, Jr.
*Attorney, Agent, or Firm*—George H. Gerstman

[57] ABSTRACT

A hub cap locking device is provided by a spoke hub cap cooperating with a hub-covering shell and a lock-carrying cap such that engagement and removal of the hub cap is controlled by key-actuation of the lock.

2 Claims, 2 Drawing Figures

HUB CAP LOCKING DEVICE

BACKGROUND OF THE INVENTION

This invention relates to an improved hub cap locking device.

In the automotive industry most automobile tires are equipped with some type of hub caps. Because of today's rising costs of metal and labor, replacement of hub caps is quite expensive. Many automobile owners order, as an accessory item either from the automobile manufacture or from a local automobile supply house, expensive custom-made or sports-car type hub caps to improve the appearance of their automobile. Many foreign and domestic spots car manufacturers equip their automobiles with attractive, but very expensive, hub caps as a standard item with each automobile.

The simple removability of hub caps has become a serious problem, because it stimulates theft, and as stated above, replacement of hub caps is very expensive.

Many prior art devices have unsuccessfully attempted to solve this problem. The reasons for their failure vary. Some of the prior art devices are so complex and their parts so intricate that the costs of manufacturing these devices are prohibitive in today's market. Other prior art devices use a variety of parts, that for one reason or another in today's shortages of materials, are either unavailable or scarce. Still other prior art devices have a configuration or shape that may be difficult and expensive to manufacture from an engineering standpoint, and therefore may be too expensive for the average automobile owner. U.S. Pat. No. 2,005,535, U.S. Pat. No. 2,722,822, and U.S. Pat. No. 3,534,570 are examples of such prior art devices.

It is, therefore, an object of this invention to provide a hub cap locking device which is simple in design and construction and is relatively easy and inexpensive to manufacture.

Other objects and advantages of the invention will become apparent from the following description and appended claims.

BRIEF DESCRIPTION OF THE INVENTION

In accordance with the present invention, there is provided a spoke (or "wire wheel") hub cap which is removably mountable about the raised disk portion of a hub-covering shell. A lock-carrying crown cap includes a central, axial cylinder lock to provide an elongated key-actuated threaded stem. The key-actuated threaded stem engages a threaded female member attached to the inner raised-portion surface of the hub-covering shell for enabling the hub cap to be selectively removed only by key-actuation of the lock mechanism.

A more detailed explanation of the invention is provided in the following description and claims and is illustrated in the accompanying drawings.

DESCRIPTION OF THE ILLUSTRATIVE EMBODIMENT

Figure 1:
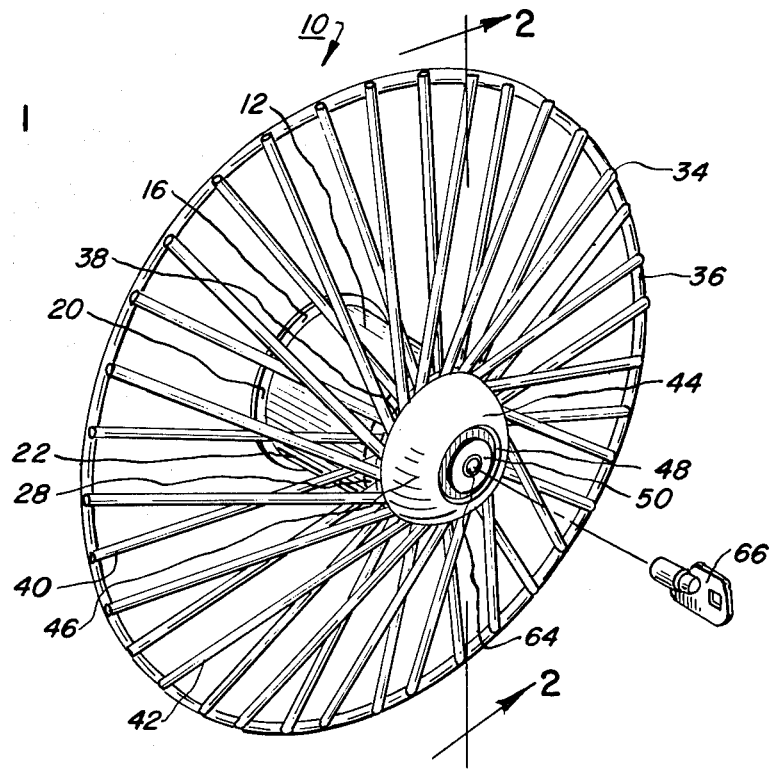
FIG. 1 is a diagrammatic perspective view of a hub cap locking device constructed in accordance with the principles of the present invention, with a key being shown preparatory to being inserted in the hub cap for operating the locking mechanism thereof.
Figure 2:
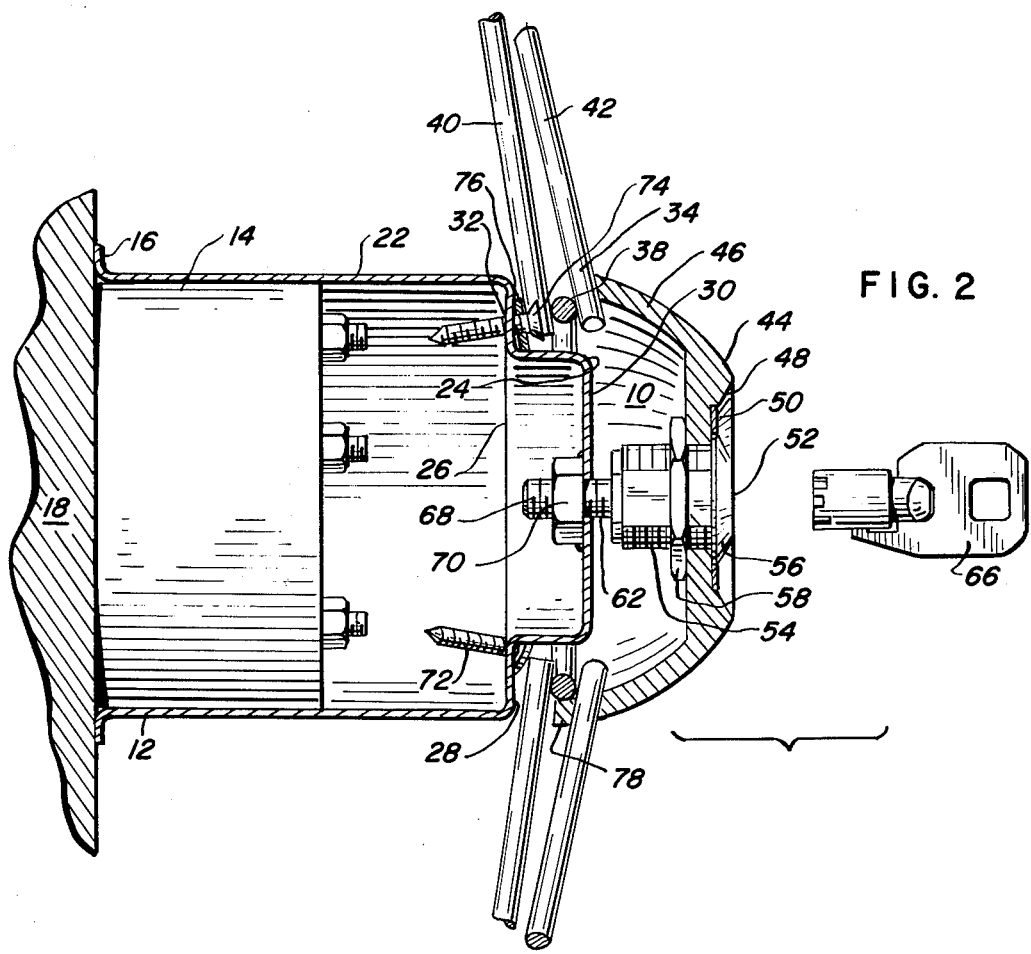
FIG. 2 is a fragmentary side elevational view of the hub cap locking device taken along the plane of line 2-2 of FIG. 1.

Referring to the figures, there is provided a hub cap locking device 10 which is mountable on the hub of a typical automobile axle and which generally covers the outer disc portion of a tire rim. A typical tire rim and axle hub is shown in FIG. 3 of U.S. Pat. No. 3,534,570.

A hub-covering shell 12, preferably formed of inexpensive sheetmetal, simply slips over a hub 14 of a typical automobile axle. Shell 12 may be simply snapped or pressed onto hub 14 to provide a snug press-fit. It is, of course, understood that hub 14 may be a typical grease cup.

Hub-covering shell 12 includes an inwardly-facing flange 16 which is mountable against the outer disc surface of a tire rim 18. It is to be understood that as used herein, the term "inner" or "inwardly" represents a direction toward the center of the vehicle. It is also to be understood that the term "outer" or "outwardly" represents a direction away from the vehicle.

Flange 16 is provided with a plurality of indentations 20 for receiving and cooperatively engaging with tire-rim nuts for securing shell 12 against tire rim 18. In the illustrative embodiment, there are four such flange indentations 20. Shell 12 further includes a hub-engaging radial skirt 22 that encloses the radial surface of hub 14, and a top or integral cap portion 24 of the shell that encloses the outer axial surface 26 of hub 14. Outer cap 24 includes a shoulder member, generally 28, and a head or raised disc member, generally 30. One or more detent-receiving axial apertures 32 are defined by shoulder 28. In the illustrative embodiment, there are three shoulder-apertures 32. A stem-receiving aperture is provided generally in the center of raised member 30.

A hub cap, generally 34, is provided for generally covering the outer disc-surface 18 of the tire rim. In the illustrative embodiment, hub cap 34 is made from wire-drawn metal, such as aluminum or any iron-alloy that is well-known in the art. The metal wire is shaped to provide a first generally circular rim 36 having a diameter slightly less than the diameter of rim disc-surface 18, and a second generally circular rim 38 which slidably engages the radial surface of raised head-member 30. First rim 36 is axially inward of second rim 38 and is closely adjacent tire rim 18. Radial spokes 40 are welded to the axial outer surface of first annular rim 36 and to the inner axial surface of second annular rim 38. Overlying angular spokes 42 are welded to the outer axial surfaces of both the first and second annular rims 36 and 38.

A crown-cap, generally 44, preferably molded from an inexpensive metal or plastic, is shaped to provide a curved radial skirt 46 and is molded and polished so as to have a smooth exterior surface and hemispheric-type curvature so as to render it virtually impossible to effectively grip and rotatably remove crown cap 44 with wrenches or the like. A beveled rim portion 48 connects the axially outermost edge of curved skirt 46 to a generally flat disc member 50 to form a crown-cap cover. Curved skirt 46 is of an axial depth and radial width sufficient to substantially enclose, with disc 50, the shell-cap 24. Disc element 50 is bored generally in the center for receiving a lock mechanism 52.

Lock mechanism 52 includes a threaded barrel member 54 fixedly engaged in the crown disc-aperture and has a pair of diametrically-opposing flat surfaces. Abutting the axial outer surface of crown-disc 50 is a tapered head 56 integral with the outer edge of barrel member 54 and covering the crown-disc aperture. A female barrel-engaging, threaded member 58, such as a lock nut, threadedly engages barrel member 54 on the inner axial-side of crown cap 44. Crown-cap 44 is therefore clamped or sandwiched between tapered head 56 and threaded-member 58. Furthermore, barrel-engaging threaded-member 58 serves to prevent relative rotation of the barrel member 54 with respect to crown-cap 44. There may also be provided a tubular casing or collar secured within barrel 54 by a simple press-fit.

In the illustrative embodiment, the locking mechanism is of the "Ace" type and includes an elongated axial member 62 which is rotatable within barrel 54 and which has at its outer end a cylindrical-end portion 64 (FIG. 1) for cooperative locking engagement with a lock-key 66. A threaded stem or coupler 68 which may have diametrically-opposed flat surfaces extends axially inward from elongated member 62. When key 66 is inserted in end portion 64, the key may be turned to rotate threaded stem 68.

A female-threaded coupler member 70 for engaging coupler 68, such as a lock nut, is attached to the inner axial surface of the raised-disc stem-receiving aperture.

An elongated self-threading detent 72 is secured within axial shoulder aperture 32. Detent 72 provides an abutment head 74 which is generally adjacent the outer shoulder 28. A lock washer 76 may be provided between abutment head 74 and shoulder 28 for preventing movement of detent 72 and for positioning abutment head 74 axially outward of shoulder 28 thereby positioning head 74 for abutment engagement with radial spokes 40. Abutment head 74 is provided for substantially preventing rotatable movement of radial spokes 40 relative to tire rim 18 and the automobile tire. In the illustrative embodiment, detent 72 is a self-threading screw wherein the screw head is filed or otherwise flattened to provide abutment head 74. In the illustrative embodiment, there are three generally equally spaced detents 72.

Shoulder apertures 32 may be formed when self-threading detent 72 is screwed into outer shoulder 28. Furthermore, detent 72 need not be elongated or self-threaded, and a simple abutment head may be bonded by epoxy resin or another adhesive to the outer shoulder 28 which would, of course, eliminate the need for shoulder apertures 32.

In the illustrative embodiment, crown cap 44 also has a generally axial-inward lug 78 which abuts angular spokes 42 and the lateral surface of second annular rim 38 for substantially preventing manual rotation of crown cap 44 once stem 68 is in threaded engagement with stem-receiving member 70.

Hub-covering shell 12, hub cap 34 and crown-cap 44 may be inexpensively plated by any metallic electroplating method wellknown in the art to give hub cap locking device 10 a shiny, polished appearance.

Assembly of hub cap locking device 10 is very easy. Hubcovering shell is inserted over hub 14 and tire rim nuts are tightened against other flange indentations 20 to secure shell 12. Second annular rim 38 of hub cap 34 is inserted in shoulder 28. Crown cap 44 is then placed over hub cap 34 so that threaded stem 68 engages stem-receiving member 70. Key 66 is inserted in lock mechanism 52 and turned so as to tighten crown cap 44 against hub cap 34 until hub cap 34 is secured against shell 12.

In operation, hub cap 34 may not be removed until lock key 66 actuates lock mechanism 52. Key 66 is simply inserted in lock mechanism 52 and turned counterclockwise so as to disengage threaded stem 68 from stem-receiving member 70, thereby permitting controlled removal of crown-cap 44. Once crown-cap 44 is removed, hub cap 34 may be lifted off of shell 12.

It should, of course, be understood that any hub cap 34, whether it be spoke or disc-shaped or some other shape, could be interchangeably used in this hub cap locking device provided the hub cap 34 defines an aperture having an inside diameter approximating the inside diameter of second annular rim 38 so as to permit engagement of hub cap 34 about raised portion 30.

It can be seen that a hub cap locking device has been provided that is relatively simple in design and easily assembled, and which is an efficient and reliable anti-theft hub cap locking device.

It can also be seen that an improved hub cap locking device having a curved-skirt crown-cap has been provided that effectively resists tampering and unauthorized removal of the hub cap by wrenches and the like.

Although an illustrative embodiment of the invention has been shown and described, it is to be understood that various modifications and substitutions may be made by those skilled in the art without departing from the novel spirit and scope of the invention.

What is claimed is:

1. A device for preventing the unauthorized removal of a wire-spoke hub cap, comprising, in combination:
   a hub-covering shell having a cylindrical hub-engaging skirt and a head with a coupling aperture defined therein;
   a crown cap including a curved radial skirt of a circumferential size and dimension for positioning the hub cap about said head adjacent said hub-covering shell and having a smooth exterior convex surface for preventing removal of the crown cap with a wrench-like tools and defining a lock-engaging aperture;
   elongated threaded locking means positioned within said lock-engaging aperture and rotatable in a first direction for threaded interlocking engagement with said coupling aperture to lock said hub cap, said elongated threaded locking means being rotatable in a second direction to permit removal of said hub cap;
   manually-operable actuating means selectively insertable into cooperative interlocking engagement with said threaded locking means for rotation of the latter;
   said hub-covering shell including a shoulder integrally connecting said radial skirt and the head and defining at least one detent-receiving aperture;
   detent means carried by the detent-receiving aperture for abutting the wire spokes of said hub cap; and
   said crown cap including at least one lug abutting said wire spokes and operating with said detent means for substantially preventing rotation of said hub cap.

2. A device for preventing the unauthorized removal of a wire-spoke hub cap, comprising, in combination:
   a hub-covering shell having a cylindrical hub-engaging skirt and a head with a coupling aperture defined therein, said coupling aperture including an internally-threaded nut having one surface positioned against said hub-covering shell;

a crown cap including a curved radial skirt of a circumferential size and dimension for positioning the hub cap about said head adjacent said hub-covering shell and having a smooth exterior convex surface for preventing removal of the crown cap with wrench-like tools and defining a lock-engaging aperture;

said hub-covering shell including a shoulder integrally connecting the hub-engaging skirt and the head and defining at least one detent-receiving aperture;

detent means carried by the detent-receiving aperture for abutting the wire spokes of said hub cap;

said crown cap including at least one lug abutting said wire spokes and operating with said detent means for substantially preventing rotation of said hub cap;

elongated threaded locking means positioned within said lock-engaging aperture and rotatable in a first direction for threaded interlocking engagement with said coupling aperture to lock said hub cap, said elongated threaded locking means being rotatable in a second direction to permit removal of said hub cap;

said threaded locking means including an externally-threaded barrel with diametrically opposed flat surfaces receivable in the lock-engaging aperture, a threaded nut engageable with said barrel for securing said barrel to said crown cap, and an elongated externally-threaded member with diametrically opposed flat surfaces extending from said barrel and rotatably coupled thereto; and manually-operable actuating means selectively insertable into cooperative interlocking engagement with said threaded locking means for rotation of the latter, said manually-operable actuating means including a key operatively associated with said locking mechanism.

* * * * *